(12) United States Patent
Buckley et al.

(10) Patent No.: US 6,248,809 B1
(45) Date of Patent: Jun. 19, 2001

(54) ULTRAFILTRATION PROCESS FOR THE RECOVERY OF POLYMERIC LATICES FROM WHITEWATER

(75) Inventors: Randall George Buckley, Mt. Laurel, NJ (US); George Lafayette Eastburn, Pineville; Marion Charles Schmitz, Richboro, both of PA (US); Barry Richard Breslau, Acton; Shawn Patrick Tansey, Westford, both of MA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 08/227,158

(22) Filed: Apr. 13, 1994

Related U.S. Application Data

(62) Division of application No. 07/914,288, filed on Jul. 15, 1992, now Pat. No. 5,342,863, which is a division of application No. 07/695,863, filed on May 6, 1991, now Pat. No. 5,171,767.

(51) Int. Cl.$^7$ .............................. B01D 21/24; B01D 63/08
(52) U.S. Cl. .......................... 523/310; 210/650; 210/651
(58) Field of Search .............................. 523/310; 210/650, 210/651

(56) References Cited

U.S. PATENT DOCUMENTS

| 3,956,114 |   | 5/1976 | DelPico et al. | 210/23 F |
|-----------|---|--------|----------------|----------|
| 4,160,726 |   | 7/1979 | DelPico        | 210/23 F |
| 4,369,266 | * | 1/1983 | Kuhls et al.   | 523/332  |
| 4,526,914 | * | 7/1985 | Dolin          | 524/42   |
| 4,986,917 |   | 1/1991 | Adams et al.   | 210/634  |

OTHER PUBLICATIONS

Desalination, vol. 77, No. 1/3, 1990, Amsterdam (pp 135–179).

* cited by examiner

*Primary Examiner*—Terrel Morris
*Assistant Examiner*—John J. Guarriello

(57) ABSTRACT

Polymer is recovered by ultrafiltration from a whitewater waste stream generated during the production of a polymer latex. The whitewater stream is circulated through an ultrafiltration system in laminar flow, under conditions of shear insufficient to destabilize the whitewater emulsion, and the recovered polymer is in the form of an emulsion which may be blended at significant levels into the original polymer latex without degrading its performance properties.

2 Claims, 1 Drawing Sheet

ULTRAFILTRATION PROCESS FOR THE RECOVERY OF POLYMERIC LATICES FROM WHITEWATER

This is a divisional of application Ser. No. 914,288, filed Jul. 15, 1992 now U.S. Pat. No. 5,342,863 which in turn is a divisional of U.S. Ser. No. 695,863, filed May 6, 1991, which has issued as U.S. Pat. No. 5,171,767.

BACKGROUND OF THE INVENTION

Polymer latices, also termed polymer emulsions, are widely used in industrial applications, including binders for paints, printing inks, non-woven fabrics and the like, paper coatings and the like. These latices may be prepared in continuous or batch processes by polymerizing monomers, usually ethylenically unsaturated compounds, in the presence of water, surfactants and other adjuvants that affect the manufacturing process or the properties of the latices.

Economics may dictate that the same kettles, piping and other equipment be used to produce different latices, so the equipment must be cleaned between batches. Even where a single latex is produced on a continuous basis, the equipment must still pe cleaned periodically.

Cleaning usually comprises washing the equipment with water; this creates large volumes of dilute aqueous latex known as whitewater. Whitewater thus created normally has a solids concentration of about 5% by weight or less, although it may be higher. This solids concentration representing emulsion-sized particles of the original polymer product. In addition to these submicroscopic polymeric particles of the latex, whitewater may also contain alcohols or other organic liquids, surfactants and the like. As produced, the solids concentration of the whitewater emulsion is far below the typical 40% or greater found in the original polymer latex, but it represents enough suspended organic matter to cause a serious waste-disposal problem.

Typical whitewaters may contain emulsion-sized particles of polymers such as styrenics, acrylics such as polymers of esters of acrylic or methacrylic acids, acrylonitrile, vinyl polymers such as poly(vinyl chloride), and complex copolymers of two or more such materials, with crosslinkers, graftlinkers and the like, such as butadiene, divinylbenzene, ethylene glycol dimethacrylate, allyl methacrylate and the like.

In typical manufacturing operations, the whitewater generated by batches of different polymer types are combined, and the entire mixture is treated as a single waste stream. To reduce the volume of waste, the whitewater is frequently concentrated before disposal, typically by chemical coagulation, coarse filtration, and in some cases ultrafiltration. The concentrated or coagulated waste, which is a mixture of whatever polymers the equipment happened to be making, plus cleaning agents and miscellaneous contaminants, is then typically buried in land-fill, or used as filler in asphalt or as a dust-control agent on roadways.

Semipermeable membrane filtration, and in particular ultrafiltration, has been employed to concentrate polymer emulsions or latices. In the ultrafiltration process a latex is pumped into the inlet end of a hollow membrane fiber, or cartridge comprising several of these fiber in parallel; the walls of these tubes are "semipermeable", that is, they allow materials of low molecular weight to pass through, but are impermeable to higher-molecular-weight materials such as polymer. The pumped latex flows through the hollow lumen of the membrane fiber parallel to its walls; this flow is known as "cross flow". As the latex transits the lumen of the membrane fiber, water, salts, surfactants and other low-molecular-weight materials pass from the latex through the walls of the membrane. The flow rate through the membrane wall per unit of membrane surface area is the membrane "flux", and the liquid which has passed through the membrane wall is called the "permeate". The polymer and other high-molecular-weight materials which do not pass through the membrane wall appear in the "retentate", which emerges along with some of the water from the exit end of the membrane fiber or cartridge under the pumping pressure, and is recycled through the fiber or cartridge until the desired concentration is reached. Transmembrane pressures, that is, pressures across the membrane wall, are typically from about 70 to about 1400 kiloPascals (kPa), more typically from about 140 to about 700 kPa. Hydrodynamic pressures, that is, pressures across the length of the membrane fiber or cartridge, depend upon the viscosity of the latex at the operating temperature, and are typically in the same range as for the transmembrane pressures. Temperatures for the ultrafiltration process are typically within the range of about 5° C. to about 70° C., and more typically about 10° C. to about 40° C.

The above description of ultrafiltration is based upon the ultrafiltration membrane being configured as a hollow fiber. Ultrafiltration membranes may also be configured as larger tubes or as sheets, which may be used singularly or in pairs with the active membranes facing one another and the liquid to be treated being passed between them; such sheets may be used flat or wound into spiral tubes. Other configurations are known to those skilled in the art.

The latex is sheared as it is pumped through the ultrafiltration system. Sources of shear include the pump or other device used to propel the whitewater through the system, and the ultrafiltration cartridge itself; shear occurs as the whitewater is forced under pressure into the relatively small inlet port or ports into the cartridge, and as the walls of the membrane resist the flow of the whitewater. This mechanical shearing contributes to destabilizing the latex and forming a coagulum, or aggregate of polymeric latex particles, which fouls the membrane surface and pores, reducing flux rate through the membrane. The ultrafiltration process also removes some of the water from the aqueous phase and removes surfactant from the polymer latex, which also helps destabilize the latex. Such destabilized latices do not retain their original performance properties, and must be regarded as low grade product or waste.

As a result, previous attempts at concentrating whitewater by ultrafiltration produced mixed success, because many latices proved to be unsuited for the process The flux, which was initially satisfactory, deteriorated rapidly because of the fouling described above. The membranes required frequent cleaning, for instance by washing them with surfactants or solvents, as described in U.S. Pat. No. 3,956,114, to remove the fouling and at least partially restore the flux rate. This frequent cleaning not only removed the system from service, reducing the overall throughput of the system, but also was only partially effective, so the overall life of the membrane filter was often unsatisfactorily short.

In U.S. Pat. No. 4,160,726, the problem of coagulum formation, as it relates to fouling, was addressed by adding surfactant to the whitewater latex prior to or during the concentration process, in an attempt to stabilize the latex. While partially successful, this approach did not necessarily work for all whitewater latices, and did not address the change in properties of the retained latex.

An object of the present invention is to provide a process by which the polymer latices recovered from whitewater may be recycled into high-value product instead of being treated as low-value waste and by-product. Another object of the present invention is to provide an apparatus to recover such high-value product, and yet another object is to provide the high-value, polymeric product so recovered. Other objects of the invention will be apparent from the specification and claims which follow.

SUMMARY OF THE INVENTION

We have discovered a process for recovering a polymer latex product from a whitewater emulsion which comprises the steps of (a) contacting the whitewater emulsion with an ultrafiltration membrane having an active membrane side and a porous support side so that the emulsion flows in laminar flow across the active membrane side under a pressure higher than the pressure on the porous support side, to remove water from the emulsion, (b) recirculating the emulsion such that it flows in laminar flow across the active membrane side repeatedly until the emulsion has been concentrated to a solids content of 20 weight percent or greater, and (c) returning the concentrated emulsion to the polymer latex product, wherein the whitewater emulsion is subjected to shear insufficient to destabilize the whitewater emulsion, and wherein the whitewater emulsion is a byproduct formed by diluting the polymer latex product with an aqueous liquid. The concentrate from this process is of good quality and may be blended with the product streams without affecting the properties of the products.

We have further discovered an apparatus for recovering a polymer latex product from a whitewater emulsion which is a byproduct formed by diluting the polymer latex product with an aqueous liquid, illustrated in FIGS. 1 and 2, which apparatus comprises (a) one or more ultrafiltration cartridges having disposed therein one or more ultrafiltration membranes having an active membrane side, the cartridges further having a whitewater inlet and a whitewater outlet such that a liquid flowing between the inlet and outlet will flow, in laminar flow, in contact with the active membrane side of the membrane, and the cartridges further having a permeate outlet, the membrane separating the permeate outlet from liquid flowing between the whitewater outlet and the whitewater inlet, (b) a whitewater inlet line for the flow of liquid, the line having a discharge end and an input end, the discharge end being connected to the whitewater inlet of the ultrafiltration cartridges, (c) a pumping means for a liquid, the pumping means having an inlet and an outlet, the outlet of the pumping means being connected to the input end of the whitewater inlet line and the inlet of the pumping means being connected to a source of whitewater, (d) a return line for the flow of whitewater connected from the whitewater outlet of the ultrafiltration cartridges to the source of whitewater, the inlet of the pumping means, or the connection between them, the path for liquid flow from the inlet of the pumping means through the pumping means, through the whitewater inlet line, through the ultrafiltration cartridges from the whitewater inlet to the whitewater outlet of the cartridges and thence through the return line back to the source of whitewater, the inlet of the pumping means, or the connection between them, forming a recirculation loop.

(e) a first pressure control means disposed within the recirculation loop between the inlet of the pumping means and the whitewater inlet of the cartridges for controlling the pressure differential between whitewater inlet and the whitewater outlet of the cartridges to maintain a total shear on the whitewater emulsion in the entire apparatus below a level which will destabilize the whitewater emulsion.

We have further discovered a polymer latex recovered from whitewater emulsion generated as a byproduct during manufacture of a polymer latex product by diluting the product with an aqueous liquid, the polymer latex being recovered by contacting the whitewater emulsion with an ultrafiltration membrane having an active membrane side and a porous support side so that the emulsion flows in laminar flow across the active membrane side under a pressure higher than the pressure on the porous support side, to remove water from the whitewater emulsion, without adding additional surfactant to said polymer, the polymer latex having essentially the same physical properties as the polymer latex product from which it was generated.

DETAILED DESCRIPTION OF THE INVENTION

Figure 1:
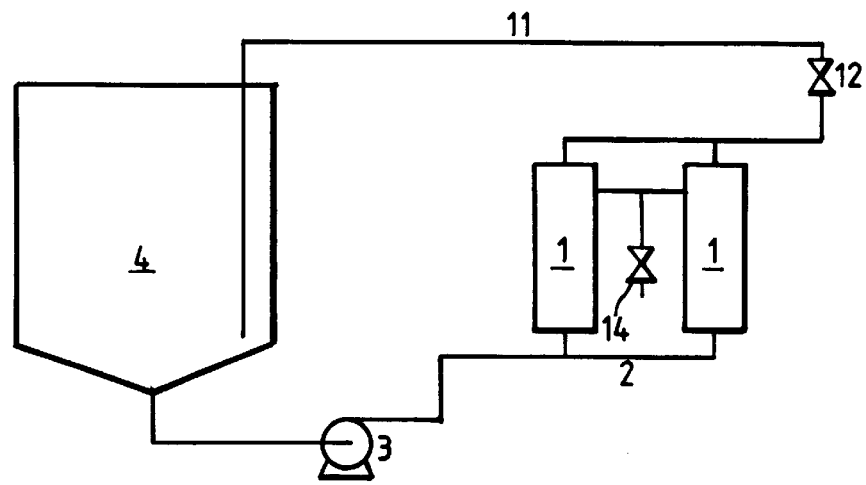
FIG. 1 shows a simple embodiment of the apparatus suitable for carrying out the process of the present invention, including the ultrafiltration cartridges (1) with their whitewater inlets (6), whitewater outlets (7) and permeate outlet (8), the whitewater inlet line (2), the pumping means (3), and whitewater source (4). Two cartridges are shown, but the invention as contemplated includes embodiments wherein only one cartridge is used, or wherein a plurality are used, in parallel as shown, in series, or in a series configuration of parallel cartridges.

We have found a process by which whitewater latices initially containing from about 1% or less, and up to about 20%, of polymer solids from a single polymer latex batch, or a series of batches of a single polymer type, may be segregated and treated by ultrafiltration to concentrate the polymer to solids levels of from about 20% to about 50%, and to recover useable product. A particularly important aspect of the present invention involves carefully controlling shear in the ultrafiltration system, particularly when the whitewater emulsion becomes concentrated and relatively viscous.

The whitewater to be treated according to the process of the present invention is preferably that generated by cleaning the equipment used to manufacture a single polymer latex batch, or a series of batches of a single polymer type. The volume of whitewater is preferably kept as small as practical, to minimize dilution of the polymer latex, by controlling the amount of rinse water, as this reduces the amount of water which must be removed by the process of the present invention, which in turn reduces the total time for the ultrafiltration process and the total shear to which the whitewater is exposed during the process. The solids content of the whitewater is thus preferably about 5 weight percent or greater, more preferably about 8 weight percent or greater, and still more preferably about 10 weight percent or greater.

Alternatively, the dilution of the polymer latex may be expressed as a percentage of the solids content of the polymer latex. Preferably the dilution of the polymer latex should yield a whitewater emulsion whose solids content is about 15% or greater, by weight, of the polymer-latex solids content, and more preferably about 20% or greater, by weight, of the polymer-latex solids content.

The critical level of shear in the process of the present invention is that which causes destabilization of the whitewater emulsion. As the whitewater is concentrated, it is subjected to shear from the pump and from contact with the membrane walls. To reduce the pump shear, the pump pressure is preferably controlled by controlling the speed of the pump. A particularly preferred means for controlling the speed is a frequency converter. Alternatively, the pressure may be controlled by a bleed valve in the line following the pump. Other approaches to controlling pressure from the pump may alternatively be used, and these would be readily apparent to those skilled in the art.

We believe that, to avoid the deleterious effects of emulsion destabilization, the shear should be minimized by maintaining the flow across the ultrafiltration membrane preferably in the laminar domain, that is, the flow across the membrane should be laminar. Another way of expressing this desired laminar-flow condition is that the Reynolds number of the whitewater flowing across the membrane is about 3000 or less, preferably about 2100 or less. While a Reynolds number of about 2100 or less is generally recognized by those skilled in the art as indicating flow in the laminar domain, the transition between laminar and turbulent flow is not abrupt, and energy input to the whitewater emulsion is still low at Reynolds numbers up to about 3000, which is considered for purposes of the present invention to be within the laminar domain. Maintaining the cross-flow of the whitewater in the laminar domain reduces the total energy input to the whitewater, and treats it in a gentler way than prior-art processes, thus keeping the whitewater emulsion stable.

Further contributing to the gentler processing of the whitewater is the use of hollow-fiber membranes in the preferred embodiment of the present invention. The preferred hollow-fiber membranes have lumens with diameters of about 3 mm or less, which produces a relatively high ratio of surface area to liquid volume, thereby allowing the removal of more water from the emulsion in a single pass across the membrane, reducing the recirculation required to reach a given solids level, and further reducing the total energy input to the whitewater emulsion.

The useable product which is recovered from the process of the present invention may be blended back into the polymer latex product of which it was originally a waste by-product, at levels of about 5% or greater, preferably about 10% or greater, more preferably about 20 or greater. In some cases material with much the same advantageous properties as the original polymer latex is obtained from the present process; such material essentially represents recovery of the original product from the whitewater. Recovery of product which may be sold as-is or blended at high levels back into the original polymer latex represents a significant economic benefit to the yield of the manufacturing process for the polymer latex, reduces the amount of solid material or concentrated latex which must be disposed of as waste, and reduces the organic-matter load on water-treatment facilities.

The ultrafiltration system of the present invention is described in detail below.

ULTRAFILTRATION MEMBRANES

Cross Flow Filtration

Successful ultrafiltration depends in part upon the high cross-flow velocity that occurs parallel to the active membrane surface. The buildup of polymer or other solids on the membrane wall decreases water flux through the membrane. Because of the loss of water through the membrane, a concentration gradient is formed close to the membrane wall; this effect is termed concentration polarization. As the solute concentration in the bulk fluid rises, the solute concentration at the membrane wall reaches a maximum, forming a gel layer. The thickness of the gel layer continues to increase as the bulk solute concentration increases. Cross flow, as opposed to dead-ended filtration, helps to sweep the membrane surface clean of solute, and minimizes the effect of the gel layer.

With the ultrafiltration of whitewater, the polymer solids are progressively concentrated, thus increasing the viscosity. This rise in viscosity reduces cross flow velocities, at a constant pressure drop across the length of the cartridge, and consequently the solute layer at the membrane wall tends to increase in size and resistance. Thus, the flux of permeate is related to the concentration of polymer solids.

Membranes

The semipermeable membranes useful in ultrafiltration may be made from a variety of materials. Although inorganic membranes such as ceramic membranes, as well as composite materials in which a ceramic membrane is supported by an organic material, or an organic membrane is supported by an inorganic structure, are within the scope of the invention as contemplated, preferred membranes are those made from synthetic or natural polymeric materials. These include membranes in which the porous support structure is integral to the membrane layer, and those in which the membrane layer is cast or otherwise layered onto the porous support structure. Particularly suitable for semipermeable membranes in our process are those synthetic polymeric materials which may be cast, spun or extruded into semipermeable membranes, and which are temperature resistant and solvent resistant.

Other suitable membrane materials include, but are not limited to, depending upon the process, polyamides, such as nylon and aromatic polyamides, polyphenylene oxides; olefinic resins, such as polypropylene, polyethylene and the like; sulfones such as polysulfone, polyethersulfone and the like, cellulosics such as cellulose acetate, cellulose nitrate, mixed cellulose acetate-nitrate and the like, sulfonated polymers such as sulfonated polysulfone, sulfonated polyethersulfone and the like. The selected material for the semipermeable membrane should preferably be suitable for the normal membrane-preparation processes, that is, it should be capable of being cast as a thin layer onto a suitable support material, extruded or spun into tubes, hollow fibers or other suitable structures, either from a melt or from solution in suitable solvents, or otherwise being formed into membranes. Copolymers made by copolymerizing two or more monomers are also among such suitable polymeric materials, as for example copolymers made by copolymerizing acrylonitrile, methacrylonitrile and other ethylenically unsaturated dienes such as isoprene and butadiene, and various acrylates, such as acrylates and methacrylates and other acrylic resins such as the esters of acrylic and methacrylic acids, as for example methyl, ethyl, isopropyl and hexyl acrylates and methacrylates.

Membranes preferred in this invention are anisotropic membranes, more preferably anisotropic, hollow-fiber membranes, and still more preferably anisotropic, hollow-fiber membranes made of polysulfone. Anisotropic membranes have a relatively thick, support structure of large, open pores, referred to herein as the "porous support", with a thin "skin", or active membrane layer which contains the selective pores, on one side. In a hollow-fiber membrane the porous support structure forms the fiber itself, and the active membrane layer forms the inner surface that defines the hollow core, or lumen, of the fiber. This inner surface is also referred to herein as the "tube side" of the membrane, as opposed to the porous support side, or outer side. The porous support structure is typically from about 125 μm to about 550 μm thick and the active membrane layer is about 0.1 μm thick. The preferred fibers of the examples had inside diameters of 1.52 to 1.90 mm (60 to 75 mil).

Although the process of the invention is described and illustrated below in terms of hollow-fiber membranes, one of ordinary skill in the art will readily understand that the process is equally adaptable to other configurations of ultrafiltration membranes, such as, but not limited to, single, flat-surface membranes, pairs of flat-surface membranes in which the active membrane layers face one another and the process stream is passed between them, spiral-wound membrane cartridges, and large-diameter membrane tubes. One of ordinary skill in the art will similarly understand the manner in which the process of the invention can be carried out using such other membrane configurations, based upon the following explanation in terms of the hollow-fiber membranes.

The hollow fibers, typically 400 to 1200 of them, may be bundled together and secured in a cartridge, which is usually made of plastic. In the ultrafiltration process the process fluid, in this case the whitewater, is passed through the hollow lumen of the fibers, and the ultrafiltered permeate, as it passes through the active membrane layer and exits via the porous support structure of the fiber, is collected within the body of the cartridge, from which it is then drained as an essentially polymer-free liquid.

In general, the polysulfone membranes may be operated under conditions which include a pH range of 1–14, a temperature from 0° C. to about 70° C., and a maximum pressure across the membrane of about 275 kPa The maximum temperature the membranes can withstand is about 70° C. and the maximum operating pressure is about 275 kPa. The membranes will not tolerate temperatures below 0° C. because the moisture entrained in the polysulfone matrix will freeze and may rupture the membrane. The polysulfone membrane is not normally used with organic solvents, as the membrane surface may be damaged or the support structure actually dissolved by certain solvents. Two different types of cartridges were used in the examples below; the PM500-75 and the PM50-60. The PM500-75 is more preferred. These cartridges are available from Romicon, Inc., Woburn, Mass. 01801. The cartridges have the following characteristics:

| | |
|---|---|
| PM500-75: | 500,000 dalton MW cut-off |
| | 1.90 mm (75 mil) ID |
| | 4.83 m² of effective membrane area |
| | 0.01–0.03 μm pore size |
| PM50-60: | 50,000 dalton MW cut-off |
| | 1.52 mm (60 mil) ID |
| | 6.13 m² of effective membrane area |
| | 0.003–0.008 μm pore size |

Both cartridges have a 12.7-cm diameter and a length of 1.092 meters. The PM500-75 cartridge contains about 790 individual polysulfone fibers and the PM50-60 cartridge contains about 1250. The PM500-75 cartridge showed slightly better flow characteristics than the PM50-60 cartridge.

ULTRAFILTRATION SYSTEMS

Components of a System

An uftrafiltration system consists of four major components; a source of liquid to be treated, an ultrafiltration membrane, and a means for moving the liquid from the source to the membrane and generating a pressure differential across the membrane. This is usually a pump or other pumping means. Ancilliary components which may be added to this simplest system include a pre-filter which removes from the liquid any particulate matter which is large enough to plug the constricted portions of the system, e.g. the lumens of hollow-fiber membranes where these are employed. simplest practical arrangement of these components is shown in FIG. 1. This set-up is termed straight batch.

Figure 2:
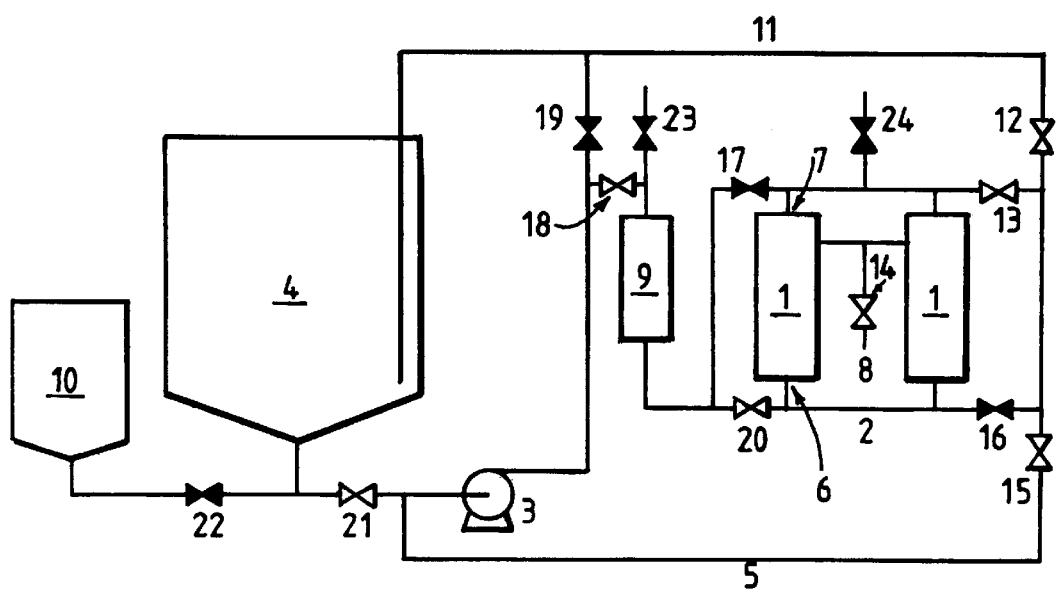
FIG. 2 shows a preferred configuration of the apparatus of the present invention, wherein a pre-filter (9), preferably a bag filter or equivalent filter, is placed in the whitewater inlet line to remove large particulate matter that may foul the cartridge membranes, a recirculating line (5) is provided to allow the whitewater to recirculate from the whitewater outlet of the cartridge to the inlet of the pump and a smaller, auxiliary source (10) of whitewater is provided. Control valves (11–22) are also indicated which permit the apparatus to be operated in the manner described below. A bleed line (11) is also shown which allows any retentate which is bled off, to reduce pressure in the system, to be returned to the whitewater source tank.

A more elaborate embodiment of the apparatus of the invention is shown in FIG. 2, which illustrates the use of additional system components: the pre-filter (9) described above, a recirculation line (5) to recirculate whitewater from the whitewater outlet of the cartridge (7) back to the inlet of the pump (3), an auxilliary tank (10) that may be used instead of the main feed tank as the whitewater source when the volume of the whitewater latex has been reduced significantly, and various control valves (12–24) which may be used to control the operation of the apparatus during the process of the present invention.

The pump must be able to circulate the process fluid at a flow high enough to maintain the desired pressure at the inlet of the cartridge, 200–275 kPa in the embodiment shown. A suitable pump is a horizontally mounted, centrifugal pump with a double mechanical water-flush seal, or a double-diaphragm pump such as the Wilden M-15 pump obtainable from Wilden Pump and Engineering Company, Colton, Calif., USA. This particular pump is a low-shear pump which is particularly advantageous in the process of the present invention; other pumps may be used if care is taken to maintain the low shear required for the process. In the preferred embodiment, this pump should be able to pump cleaning solution at about 415 liters per minutes per cartridge at an inlet pressure of about 200 kPa to insure adequate cleaning of the membrane.

Some whitewater emulsions are more sensitive to destabilization at higher temperatures. The pumping of the emulsion through the ultrafiltration system adds energy to the emulsion, raising its temperature, so a cooling means in the recirculation loop may be desirable. One suitable cooling means would be a heat exchanger, and preferably a heat exchanger that exchanges heat between the emulsion and a flowing, cooled liquid.

In whitewater ultrafiltration systems that concentrate the polymer latex to greater than 20 wt. % solids, the pressure applied to the contrentrated latex is preferably controlled to minimize shear of the latex and help prevent its destabilization. The pressure and shear tend to increase as the solids content, and consequently the latex viscosity, increase. One way to control the applied pressure is to control the speed of the pump; an alternative way is to bleed off excess pressure by bleeding whitewater from the pressurized portion of the system back into the whitewater source.

The filter (9), a bag filter or similar filter placed in the whitewater flow between the whitewater source and the whitewater inlet of the cartridge, is a preferred component of an ultrafiltration system which helps protect the hollow-fiber membrane from large particles that can plug the fibers or tear the membrane. The filter is typically positioned downstream from the pump in the recirculation loop. The filter may also be placed upstream from the pump in the feed line, although an additional pump may be needed to pump the whitewater from the feed tank through the filter. This option allows the filter to operate at lower flow rates than when it is placed in the recirculation loop. The filter should be such that it will retain particles large enough to plug the lumens of hollow-fiber membranes, or other constricted points in the system; in a preferred embodiment the filter is a screen with a mesh size that passes particles no larger than approximately half the size of the lumen diameters. Smaller-mesh filters are less preferred because they increase pressure drop and shear.

Minimizing the internal volume of the combined piping, filters, pump and cartridges, also termed the "holdup volume", and minimizing the fluid level in the feed tank, are important to the process and apparatus of the present invention. The holdup volume is preferably about 15% or less of the initial volume of whitewater to be concentrated, more preferably about 10% or less, and still more preferably about 5% or less.

The whitewater source may be a tank or similar vessel, or other source of whitewater produced during cleaning of equipment for producing a particular type of polymer latex, and stored for polymer recovery. Where the source is a tank or similar vessel, the bottom of the vessel preferably has a conical shape to facilitate maintaining a reasonable depth of latex, so that air is not drawn into the system by the pump. Alternatively an optional, smaller vessel (10) may be employed when the volume of latex has dropped below a level practical for the larger source vessel.

Maintenance Cleaning

Periodically cleaning the membrane surface may increase the flux rate of permeate. The three processes described below are suitable for this cleaning. Cleaning frequency is determined by the frequency at which the flux rate drops below a desired level, and a typical frequency is hourly. The desired flux rate is selected such that fouling of the membrane is still reversible; if ultrafiltration is continued significantly past the desired minimum flux rate, the fouling becomes more and more difficult to adequately remove, and if continued sufficiently past the desired minimum flux rate, the fouling becomes essentially permanent; that is, the membrane cannot be restored to a reasonable approximation of its initial flux rate even with extreme cleaning measures. Increased difficulty in removing fouling increases the time required for cleaning, and thus the time the membrane is out of service. A preferred value for the desired minimum flux rate is about 10% to 15% of the initial whitewater flux rate.

Reverse Flow/Recycle

Reverse flow/recycle is a combination of permeate recycling and reversing the direction of process-fluid flow. During recycle the permeate flow from the cartridge is blocked, and the pressure outside the membrane fibers is allowed to rise until it is approximately equal to the average pressure inside the fiber lumens from inlet to outlet. In such a condition, the pressure is reversed across the membrane over at least a portion of the length of the membrane; that is, a reverse pressure differential is established across at least a portion of the membrane. When this condition is established, the permeate flows from the porous support side of the membrane fibers to the tube side in the exit (lower pressure) portion of the fibers, where the reverse pressure differential is established,and from the tube side to the porous support side in the inlet (high pressure) portion of the fibers, where the pressure differential is in the normal direction, that is, the same direction as when the whitewater is being treated.

The reversed flow of the permeate, i.e., from the porous support side to the tube side of the membrane, cleans the inner surface of the fibers. This flow reversal occurs for a pre-defined time, during which automated valves also reverse the flow of the process fluid (whitewater) through the fibers. After the reverse flow/recycle sequence, the flow direction is opposite of the direction that it started and both ends of the cartridge have been cleaned by permeate recycle.

Vacuum-Flush Cleaning

Vacuum-flush cleaning is similar to reverse flow/recycle in that it involves the flow of permeate from the porous support side to the tube side of the hollow fibers. This feature is possible with high pressure bleed systems. With the pump operating, automated valves alter the flow patterns to create a negative pressure in the recirculation loop, which forces the permeate, at atmospheric pressure, back through the porous support side to the tube side, cleaning the membrane surface. Note that recirculation flow across the membrane surface ceases during this cleaning process. This process is also called "suction backwashing", and is described in, for example, U.S. Pat. No. 4,986,918.

Backflushing

Backflushing is similar to vacuum-flush cleaning except that the permeate is forced, usually by a small pump, back through the porous support side into the tube side of the hollow fiber. In this case, the process fluid may continue to recirculate through the cartridges.

Chemical Cleaning

The ultrafiltration unit should be cleaned frequently to maintain reasonable flux rates. In batch operations, cleaning after every batch is typical, while with continuous systems a reasonable compromise between flux rate and unit downtime must be selected. Cleaning after batches also helps prevent cross-contamination of different products.

A cleaning solution useful for cleaning polymeric membranes of the present invention is 1% by weight of sodium hydroxide and 200 ppm by weight of sodium hypochlorite in deionized water. Surfactants may be used separately, or with a cleaning solution such as that described above. A preferred cleaning solution is sold under the trademark, Micro®, made by International Products Corp., Burlington, N.J. and is stated by the manufacturer to contain the following major components: Glycine, N,N'-1,2-ethanediylbis-(N-(carboxymethyl)-, tetrasodium salt; Benzenesulfonic acid, dimethyl-, ammonium salt; Benzenesulfonic acid, docecyl-, cpd with 2,2',2"-nitrilotris-(ethanol); and Poly(oxy-1,2-ethanediyl), α-(nonylphenyl)-ω-hydroxy. Typical cleaning temperatures are elevated to the range of 40–60° C. to increase the cleaning rate of the solution, and typical cleaning times are about 30 to 60 minutes. The deionized water is used to prevent metal ions from fouling the membrane over long period of time.

The following examples are intended only to further illustrate the invention and are not to limit it except as it is limited in the claims. All percentages and ratios are by weight unless otherwise specified, and all reagents are of good commercial quality unless otherwise specified.

EXAMPLES 1–19

These examples are intended to illustrate the process of the present invention and its application to whitewaters from production of a wide variety of polymer latices. The polymer latices from which the whitewater samples were generated are shown below in Table 1. In that table the following abbreviations are used to indicate monomer components:

MMA—Methyl Methacrylate
MAA—Methacrylic Acid
EA—Ethyl Acrylate
BA—Butyl Acrylate
Bd—Butadiene
BMA—Butyl Methacrylate
Sty—Styrene The product designations in Table 1 indicate products of Rohm and Haas Company, Philadelphia, Pa. 19105. Those marked with [1] are Rhoplex® products and those marked with [2] are Polyco® products. Rohplex and Polyco are registered trademarks of Rohm and Haas Company.

TABLE 1

Polymer Latex Sources of Whitewater for Polymer Recovery

| Example | Product | Major Polymer Components | Application |
|---|---|---|---|
| 1 | E-1381[1] | MMA/BA | Binder for architectural coatings |
| 2 | AC-235[1] | MMA/BA | Binder for architectural coatings |
| 3 | AC-261[1] | MMA/BA | Vehicle for architectural coatings |
| 4 | E-1698[1] | MMA/EA | Vehicle for architectural coatings |
| 5 | AC-417[1] | MMA/EA | Vehicle for architectural coatings |
| 6 | E-2091[1] | MMA/BA | Binder for architectural coatings |
| 7 | E-2003[1] | MMA/BA | Binder for architectural coatings |
| 8 | E-2437[1] | BA | Vehicle for adhesives |
| 9 | N-1031[1] | BA | Vehicle for adhesives |
| 10 | B15J[1] | MMA/EA | Binder for non-woven textiles, paper coating. |
| 11 | TR-407[1] | MMA/EA | Binder for non-woven textiles |
| 12 | NW-1402[1] | EA | Binder for non-woven textiles |
| 13 | HA-16[1] | MMA/EA | Binder for non-woven textiles |
| 14 | 2150[2] | Vinyl Acetate | |
| 15 | WL-91[1] | Styrenated Acrylic | Binder for industrial coatings |
| 16 | E-1421[1] | MMA/BA/Sty | Vehicle for floor polish |
| 17 | ASE-75[1] | MMA/EA/MAA | Thickener |
| 18 | TR-934[1] | EA/BA | Binder for non-woven textiles |
| 19 | EC-1791[1] | MMA/BA | Binder for roof mastics |

These polymer latices represent a wide variety of latex products, incorporating a variety of surfactants, including anionic, nonionic and cationic surfactants. As will be shown below, polymer can be recovered from the whitewater generated during cleanup of equipment used for manufacturing each of these latices, and the recovered polymer has properties that are close enough to the original polymer latex product that the recovered polymer may be blended into the polymer latex product without degrading the performance characteristics of the product in the intended applications.

Whitewater Source

A drain tank rinse (whitewater) was pumped from a plant drain tank by a Wilden diaphragm pump (obtained from Wilden Pump and Engineering Company, Colton, Calif. USA), through an 800-$\mu$m strainer into a 1325-liter tote which was then stored until ultrafiltration.

Prefiltering the Whitewater

Whitewater from drain-tank flushes was prefiltered through an 800-$\mu$m bag filter or a Johnson sock filter as the whitewater was pumped from the tote to the feed tank by a diaphragm pump, to filter out any polymer skin or gel which may have formed on the liquid surface when the totes were stored.

Pilot Unit

The pilot unit consisted of a 4550-liter feed tank, a 380-liter auxiliary feed tank and a two-cartridge, skid-mounted ultrafiltration unit. The main components of the ultrafiltration unit were the following:

Horizontally mounted centrifugal pump with a double mechanical water-flush seal, rated for 7460 Joule/second (10 horsepower) at 1750 RPM, capable of pumping 530 liters/minute against a 270 kPa head.

Speed control for the pump.

Bag filter positioned after the pump in the recirculation loop.

Two 1.09-meter-long, 12.7-cm-diameter membrane cartridges.

Recirculation loop with option of:
 a. High pressure bleed
 b. Low pressure bleed Automated reverse flow/recycle cleaning.

Automated vacuum-flush cleaning.

A schematic of the ultrafiltration unit is shown in FIG. 2. The auxiliary feed tank was used at the end of a run to avoid turbulence and splashing which occurred in the 4550-liter feed tank when the volume was smaller than 380 liters.

Bag Filter

The bag filter was located in the recirculation loop between the pump and the membrane cartridges. With dilute whitewater, a filtration rate of 760 liters/minute could be maintained. When 200 $\mu$m and 400 $\mu$m filter bags were used, they fouled badly, dropping the cartridge inlet pressure below 140 kPa; using 800 $\mu$m bags avoided this fouling.

Both PM50-60 and PM500-75 membranes were tested. The PM500-75 membrane was preferred for ultrafiltering whitewater because it allows higher cross-flow at higher whitewater viscosity than the smaller PM50-60 membrane.

Start-up

For start-up, the unit was flooded with water, trapped air was bled off, and the pump speed was increased until the desired cartridge inlet pressure was reached.

Trapped air was bled by opening vents on the upper cartridge manifold and the bag filter while the pump was running. To protect the membranes, the permeate ports on the porous support side of the cartridges were kept closed during this bleed. Once the desired cartridge inlet and outlet pressures were reached, the permeate ports were re-opened.

Under normal operation, the permeate flows into the vacuum flush tank, through the cleaning tank and to a drain.

Operating Parameters

The inlet and outlet cartridge pressure was maintained at 210 kPa and 35 kPa, respectively. At high solids levels, greater than 30 weight percent, the viscosity increased rapidly, which increased the inlet pressure on the cartridges and the pressure drop through the cartridge. The pump speed was controlled to maintain the inlet pressure at 200–240 kPa. The outlet pressure was controlled with valves in the recirculation loop and the low pressure bleed line.

Most products which were ultrafiltered to high solids concentration required pump speed-control settings of about 85–100% of maximum, although a few of the highly viscous products required 80% settings to maintain the 210 kPa inlet pressure. Most ultrafiltration runs began at temperatures in the range of 15–25° C. and ended at 30–45° C., and required 2 to 5 hours for completion.

After the cartridge operating pressures were set, the system was either left at a manual setting, without any maintenance cleaning, or set to automatic, with the reverse flow/recycle and/or the vacuum-flush cleaning feature activated.

Shut-down

When the desired solids concentration was reached or the retentate volume dropped to 130 liters, the system pump was turned off and the unit was drained and sampled for blending and lab analysis. The automated reverse-flow valves were activated and the system was shut off with the valves in their half-way positions to allow complete drainage.

Water Flush

After the system had completely drained of concentrated whitewater, it was set to its cleaning mode and flushed with water, or with the permeate that had collected in the cleaning tank during processing. In the cleaning mode, the system feeds from the built-in cleaning tank, thus segregating the whitewater feed tank from the unit. The unit was flushed for a total of 5 to 10 minutes, then drained as with the concentrated whitewater.

Cleaning

The unit was cleaned with an aqueous, 1% sodium hydroxide solution, optionally with a small amount of Micro® cleaning solution (described above), prepared using deionized water, at 30–60° C. During cleaning the inlet and outlet cartridge pressures were the same as with normal processing, 210 and 35 kPa, respectively. The permeate valves were closed to place the cartridges in recycle, and the unit could be set to manual or automatic mode. In automatic mode the flow direction reversed every 15 minutes.

To clean residual caustic from the membranes and piping after the cleaning solution was drained, the unit was flushed with tap water, and tap water was circulated through the system at the same operating pressure as in normal processing, but with the cartridges set to recycle.

Using the above-described procedure and equipment, 19 separate batches of whitewater from the production of the polymer latices of Examples 1–19 were treated to recover the polymer.

Cartridge Flow Data

At high solids, the flow through the cartridges was low enough that the instantaneous flux could be roughly measured by placing the unit in straight batch and measuring the return flow rate. The results are for a PM500-75 mil membrane at 275 kPa inlet and 55 kPa outlet cartridge pressure are shown below:

TABLE 2

Flux and Cartridge Flow Rate for Typical Whitewater Latices

| | Brookfield Viscosity (Centipoises) | Cartridge Flow Rate (Liters/minute) | Solids (wt. %) | Approx. Flux (liters/m2/day) |
|---|---|---|---|---|
| Example 18 | 92 | 68 | 45.7 | 120 |
| Example 19 | 100 | 102 | 52.7 | 120–160 |
| Example 14 | 103 | 151 | 46.2 | 120–160 |

As may be seen from Table 2, even at relatively high solids levels, where concentration polarization would be expected to cause low flux rates, the observed rates are high enough to be practical.

Similarly, Table 3, below, shows that the wide range of whitewater emulsions described in Table 1 may be ultrafiltered according to the process of the present invention, at practical flow rates. In Table 3, the average flux value is determined by averaging the flux through one of five PM500-75 cartridges (described above) over the solids range from 4% to 30%.

TABLE 3

Individual Average Fluxes for 4 to 30 wt. % Solids

| Example | Cartridge | Avg. Flux liters/m$^2$/day |
|---|---|---|
| Architectural Coatings | | |
| 1 | 1 | 1426 |
| | 2 | 1263 |
| 2 | 3 | 937 |
| | 4 | 937 |
| 3 | 4 | 937 |
| | 5 | 1670 |
| 4 | 3 | 1507 |
| | 4 | 855 |
| | 4 | 774 |
| 5 | 3 | 1181 |
| 6 | 4 | 1140 |
| | 4 | 733 |
| | 5 | 1222 |
| | 1 | 1018 |
| | 2 | 896 |
| 7 | 4 | 978 |
| | 5 | 1548 |
| Avg. Flux = 1100 ± 570 liters/m$^2$/day | | |
| Adhesives | | |
| 8 | 4 | 2485 |
| 9 | 1 | 2404 |
| | 2 | 2404 |
| Avg. Flux = 2445 ± 80 liters/m$^2$/day | | |
| Textile Binders | | |
| 11 | 5 | 1467 |
| | 1 | 1548 |
| | 2 | 1548 |
| 12 | 1 | 1222 |
| | 2 | 1222 |
| 13 | 3 | 652 |

TABLE 3-continued

Individual Average Fluxes for 4 to 30 wt. % Solids

| Example | Cartridge | Avg. Flux liters/m$^2$/day |
|---|---|---|
|  | 4 | 896 |
| 14 | 1 | 1345 |
|  | 2 | 1263 |
| Avg. Flux = 1182 ± 650 liters/m$^2$/day | | |
| Other | | |
| 19 | 1 | 1870 |
|  | 2 | 1508 |
| 15 | 4 | 570 |
| 16 | 4 | 693 |
|  | 5 | 774 |
| 17 | 1 | 1263 |
|  | 2 | 1263 |

Note: Error is ± Two Standard Deviations

Applications Testing

Applications testing was conducted by blending polymer recovered by the process of the present invention into samples of the polymer latex from which the whitewater was generated, and subjecting the blends to the same tests used to determine the suitability of the polymer latex for its intended application. Thus the materials recovered by ultrafiltration according to the present invention of whitewater emulsions from Examples 3 and 4 were tested by blending them, at levels of 1% and 5% by weight, into the original products of Examples 3 and 4 and testing the paint performance of the resulting polymer latex; no adverse effects on paint performance properties were seen.

Similarly, the recovered material of Example 10 was tested at similar blend levels for gloss, brightness, opacity and surface pick strength in standard paper-performance testing; no adverse effect was seen.

Similarly, the recovered material of Example 11 was tested at similar blend levels for wash durability by spraying the polymer latex onto a polyester web and laundering it under household laundry conditions for five cycles; no adverse effect on durability was seen.

Similarly, the recovered material of Example 12 was tested at similar blend levels for tensile strength and stretch on a simulated "wet-wipe" non-woven fabric. Another test of tensile strength that involved soaking the fabric in a simulant for the consumer lotion used with wet wipes and comparing the results after a 1-hour soak and after soaking at 49° C. for 10 days was run using the material of Example 12 at the 1% and 5% blend levels; no adverse effect on any of these properties was seen.

Similarly, the recovered material of Example 16 was tested at similar blend levels for floor-polish properties; no adverse effect was seen.

Similarly, the recovered materials of Examples 1, 3, 4, 6 and 7 were tested at similar blend levels as emulsions for the following properties: freeze-thaw stability by exposing to 5 cycles of freezing and thawing; heat aging, by heating to 60° C. and holding at that temperature for 10 days; and mechanical stability, by agitating in a Waring Blendor® mixer for five minutes at high speed. These same materials were blended into standard paint formulations and tested for gloss, adhesion, color acceptance and the freeze-thaw stability and heat ageing described above. Except for the color acceptance tests for the materials of Examples 1 and 6, for which no data are available, no adverse effect was seen on any of these properties for any of these materials as recovered emulsions or as paints formulated from the recovered emulsions.

Emulsion Stability

Samples of the final, concentrated, ultrafiltered emulsions were transferred to glass jars and allowed to settle by gravity for two weeks. To compare the stability of the ultrafiltered product of the present process with the whitewater, samples of whitewater were prepared by diluting the original polymer latex product to 5% solids with deionized water. These were also allowed to settle by gravity for two weeks. The results of this test, reported as centimeters of clear liquid layer formed above the emulsion after the time periods indicated, are shown below in Table 4. The ultrafiltered product of the present process was observed to be at least as stable as, and frequently more stable than, the whitewater from which it was prepared.

TABLE 4

Settling of Ultrafiltered Emulsion

| | Ultrafiltered Emulsion | | 5% Whitewater Emulsion | |
|---|---|---|---|---|
| Example | 1 Week | 2 Weeks | 1 Week | 2 Weeks |
| 1 | 0 | 0.2 | 1.3 | 2.5 |
| 2 | 0 | 0 | | |
| 3 | 0 | 0 | 0 | 0 |
| 4 | 0 | 0 | 1.0 | 1.3 |
| 5 | 0 | 0.2 | | |
| 6 | 0 | 0 | | |
| 7 | 1.3[1] | 1.3 | 1.3[1] | 1.9 |
| 8 | 0 | 0.2 | | |
| 9 | 0 | 0 | | |
| 10 | 0 | 0 | 0 | 0 |
| 11 | 0 | 0 | | |
| 12 | 0 | 0 | 0 | 0.3 |
| 13 | 0 | 0 | | |
| 14 | 0 | 0 | 0 | 0 |

[1]After one day

The above results show that the polymer latex recovered by the process of the present invention is capable of being blended into undiluted polymer latex at significant levels without deleteriously affecting the important properties of the undiluted latex. Such a capability means that the polymer in the whitewater emulsion, which heretofore has represented only waste to be disposed of, or a low-grade byproduct, may now be returned to the product stream, significantly increasing the yield of the process and significantly reducing the environmental problem of waste disposal.

Although the invention has been described with regard to its preferred embodiments, which constitute the best mode presently known to the inventors, various changes and modifications which would be obvious to one having ordinary skill in this art may be made without departing from the scope of the invention which is defined by the claims.

We claim:

1. A polymer latex recovered from whitewater emulsion by contacting the whitewater emulsion with an ultrafiltration membrane under laminar flow conditions, to remove water from the whitewater emulsion, wherein the whitewater is generated by diluting a polymer latex product, and wherein the polymer latex so recovered may be blended into the product at a level of at least 5 weight percent with no deleterious effect upon performance properties of the product.

2. The polymer latex of claim 1 wherein the ultrafiltration membrane has an active membrane side and a porous support side so that the emulsion flows in laminar flow across the active membrane side under a pressure higher than the pressure on the porous support side.

* * * * *